(12) United States Patent
Duzdar et al.

(10) Patent No.: US 7,587,183 B2
(45) Date of Patent: Sep. 8, 2009

(54) MULTI-FREQUENCY ANTENNA ASSEMBLIES WITH DC SWITCHING

(75) Inventors: Ayman Duzdar, Holly, MI (US); Tan Dinh Quach, Grand Blanc, MI (US); Keith J. Schrag, Lapeer, MI (US)

(73) Assignee: Laird Technologies, Inc., Chesterfield, MO (US)

(*) Notice: Subject to any disclaimer, the term of this patent is extended or adjusted under 35 U.S.C. 154(b) by 410 days.

(21) Appl. No.: 11/640,507

(22) Filed: Dec. 15, 2006

(65) Prior Publication Data

US 2008/0146176 A1 Jun. 19, 2008

(51) Int. Cl.
*H04B 17/02* (2006.01)
(52) U.S. Cl. .................. 455/136; 455/240.1; 455/339; 375/345
(58) Field of Classification Search ........... 455/132, 455/133, 136, 230, 232.1, 234.1, 240.1, 251.1, 455/334, 338, 339; 375/345
See application file for complete search history.

(56) References Cited

U.S. PATENT DOCUMENTS

| | | | |
|---|---|---|---|
| 5,852,784 A * | 12/1998 | Ito et al. ............... | 455/552.1 |
| 6,466,768 B1 | 10/2002 | Agahi-Kesheh et al. | |
| 6,538,609 B2 | 3/2003 | Nguyen et al. | |
| 6,714,760 B2 | 3/2004 | Robinett | |
| 6,806,838 B2 | 10/2004 | Petros et al. | |
| 7,116,952 B2 | 10/2006 | Arafa | |
| 2003/0003952 A1 * | 1/2003 | Kim ....................... | 455/552 |
| 2004/0072575 A1 | 4/2004 | Young et al. | |
| 2005/0215194 A1 | 9/2005 | Boling et al. | |
| 2006/0097924 A1 | 5/2006 | Yegin et al. | |
| 2006/0205369 A1 | 9/2006 | Schaich et al. | |
| 2006/0220970 A1 | 10/2006 | Aminzadeh et al. | |
| 2008/0090514 A1 * | 4/2008 | Yegin et al. ............ | 455/3.02 |

FOREIGN PATENT DOCUMENTS

| | | |
|---|---|---|
| EP | 1357636 | 10/2003 |
| EP | 1619752 | 1/2006 |
| JP | 63004723 | 1/1988 |
| JP | 2000165135 | 6/2000 |
| WO | WO 01/03235 | 1/2001 |

OTHER PUBLICATIONS

U.S. Appl. No. 11/145,878, filed Jun. 6, 2005, Ayman Duzdar.
U.S. Appl. No. 11/494,533, filed Jul. 28, 2006, Aminzadeh et al.
E.B. Perri, "Dual band cellular antenna in a multifunction platform for vehicular applications", 2006 IEEE Antennas and Propagation Society International Symposium, Albuquerque, NM, USA, Jul. 9-14, 2006 (abstract) 2 pages.

* cited by examiner

*Primary Examiner*—Nhan T Le
(74) *Attorney, Agent, or Firm*—Harness, Dickey & Pierce, P.L.C.

(57) ABSTRACT

According to various exemplary embodiments, apparatus, systems, and methods are disclosed for use with antenna systems operable for receiving first and second signals having respective first and second frequencies. In one exemplary embodiment, a controller selectively controls whether an amplifier is electrically powered via a first receiver associated with the first frequency or a second receiver associated with the second frequency depending on whether the first receiver, second receiver, or both are present and activated.

34 Claims, 6 Drawing Sheets

US 7,587,183 B2

MULTI-FREQUENCY ANTENNA ASSEMBLIES WITH DC SWITCHING

FIELD

The present disclosure relates to multi-frequency antenna assemblies with DC switching for selective operation with either or both of a first receiver and/or second receiver.

BACKGROUND

The statements in this section merely provide background information related to the present disclosure and may not constitute prior art.

In an increasingly wireless world, antennas are becoming ever more prevalent. This is particularly true in automobiles, which typically include antennas for receiving signals associated with one or more of AM radio, FM radio, satellite radio, cellular phones, and Global Positioning System (GPS).

By way of example, FIG. 1 schematically illustrates an antenna system 10. As shown, the system 10 includes a first patch antenna 12 tuned to a first center frequency fc1. The system 10 also includes a second patch antenna 14 tuned to a second center frequency fc2. In some embodiments, the first center frequency fc1 may be a frequency used by the Satellite Digital Audio Radio Service (SDARS) (e.g., 2.320 GHz to 2.3325 345 GHz for SIRIUS Satellite Radio Service, 2.3325 GHz to 2.345 GHz for XM Satellite Radio Service, etc.), and the second center frequency fc2 may be a frequency used by the Global Positioning System (GPS) (e.g., at least 1.575 GHz, etc.).

As shown in FIG. 1, a first low noise amplifier (LNA) 16 amplifies the signal from the first patch antenna 12. A second LNA 18 amplifies the signal from the second patch antenna 14. Signals from the first LNA 16 and the second LNA 18 communicate with inputs of respective band pass filters (BPF) 20, 22 that have center frequencies at fc1 and fc2, respectively. A first amplifier (AMP) 24 amplifies the signal from an output of the first band pass filter 20. A second amplifier 26 amplifies the signal from an output of the second band pass filter 22.

A first receiver 28 receives the signal from the first amplifier 24. In some embodiments, the first receiver 28 may be a SDARS receiver that is compatible with SIRIUS satellite radio and/or XM satellite radio broadcast signals. A second receiver 30 receives the signal from the second amplifier 26. In some embodiments, the second receiver 30 may be a GPS receiver or transceiver that includes a display and/or user interface.

The first patch antenna 12, second patch antenna 14, first LNA 16, second LNA 18, first band pass filter 20, second band pass filter 22, first amplifier 24, and second amplifier 26 may be assembled into a compact antenna assembly 32. The antenna assembly 32 may be suitable for mounting on a structure, such as a motor vehicle roof, trunk, inside the instrumentation panel (IP), etc.

Coaxial cables may be used for making the connections between the first amplifier 24 and the first receiver 28 and between the second amplifier 26 and the second receiver 30. The first LNA 16, second LNA 18, and coaxial cables tend to be fairly expensive when compared to the costs associated with the other elements of the antenna assembly 32.

SUMMARY

According to various exemplary embodiments, apparatus, systems, and methods are disclosed for use with antenna systems operable for receiving first and second signals having respective first and second frequencies. In one exemplary embodiment, a controller selectively controls whether an amplifier is electrically powered via a first receiver associated with the first frequency or a second receiver associated with the second frequency depending on whether the first receiver, second receiver, or both are present and activated.

In another exemplary embodiment, an antenna system suitable for use onboard a vehicle generally includes a first antenna tuned to receive first first and second signals having respective first and second frequencies. A first stage amplifier is in communication with the first antenna for amplifying the first and second signals received by the first antenna. A single feed inputs the first and second signals to the first stage amplifier. A DC switch selectively controls whether the first stage amplifier receives DC power via a first receiver associated with the first frequency or a second receiver associated with the second frequency depending on whether the first receiver, second receiver, or both are present and activated. A diplexer is in communication with the first stage amplifier for receiving and separating output of the first stage amplifier into first and second signals. A first band pass filter is in communication with the diplexer for receiving the first signal. A second band pass filter is in communication with the diplexer for receiving the second signal. A second stage amplifier is in communication with the first band filter for receiving output of the first band pass filter. A second stage amplifier is in communication with the second band filter for receiving output of the second band pass filter.

In a further exemplary embodiment, an antenna system suitable for use onboard a vehicle generally includes a first antenna tuned to receive first and second signals having respective first and second frequencies. The system also includes a second antenna tuned to receive a third signal having a third frequency. A first stage amplifier is in communication with the first antenna for amplifying the first and second signals received by the first antenna. A single feed inputs the first and second signals to the first stage amplifier. A DC switch selectively controls whether the first stage amplifier receives DC power via a first receiver associated with the first frequency or a second transceiver associated with the second and third frequencies depending on whether the first receiver, second transceiver, or both are present and activated. A first diplexer is in communication with the first stage amplifier for receiving and separating output of the first stage into first and second signals. A first band pass filter is in communication with the diplexer for receiving the first signal. A second band pass filter is in communication with the diplexer for receiving the second signal. A second stage amplifier is in communication with the first band pass filter for receiving output of the first band pass filter. Another second stage amplifier is also in communication with the second band pass filter for receiving output of the second band pass filter. A second diplexer in communication with at least one of the second stage amplifiers for receiving output thereof and with the second antenna for receiving the third signal. A single feed outputs the combined first and third signals of the diplexer to the second transceiver.

Other exemplary embodiments include methods relating to electrically powering an amplifier of an antenna system. The antenna system may be operable for amplifying first and second signals having different frequencies. In one exemplary embodiment, a method generally includes determining whether there is present and activated one or more of a first receiver associated with the first signal and a second receiver associated with the second receiver. The method may also include electrical powering the amplifier via the first receiver when the first receiver is present and activated. But when the second receiver is present and activated and when the first receiver is not present and activated, the method may include electrically powering the amplifier via the second receiver.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4:
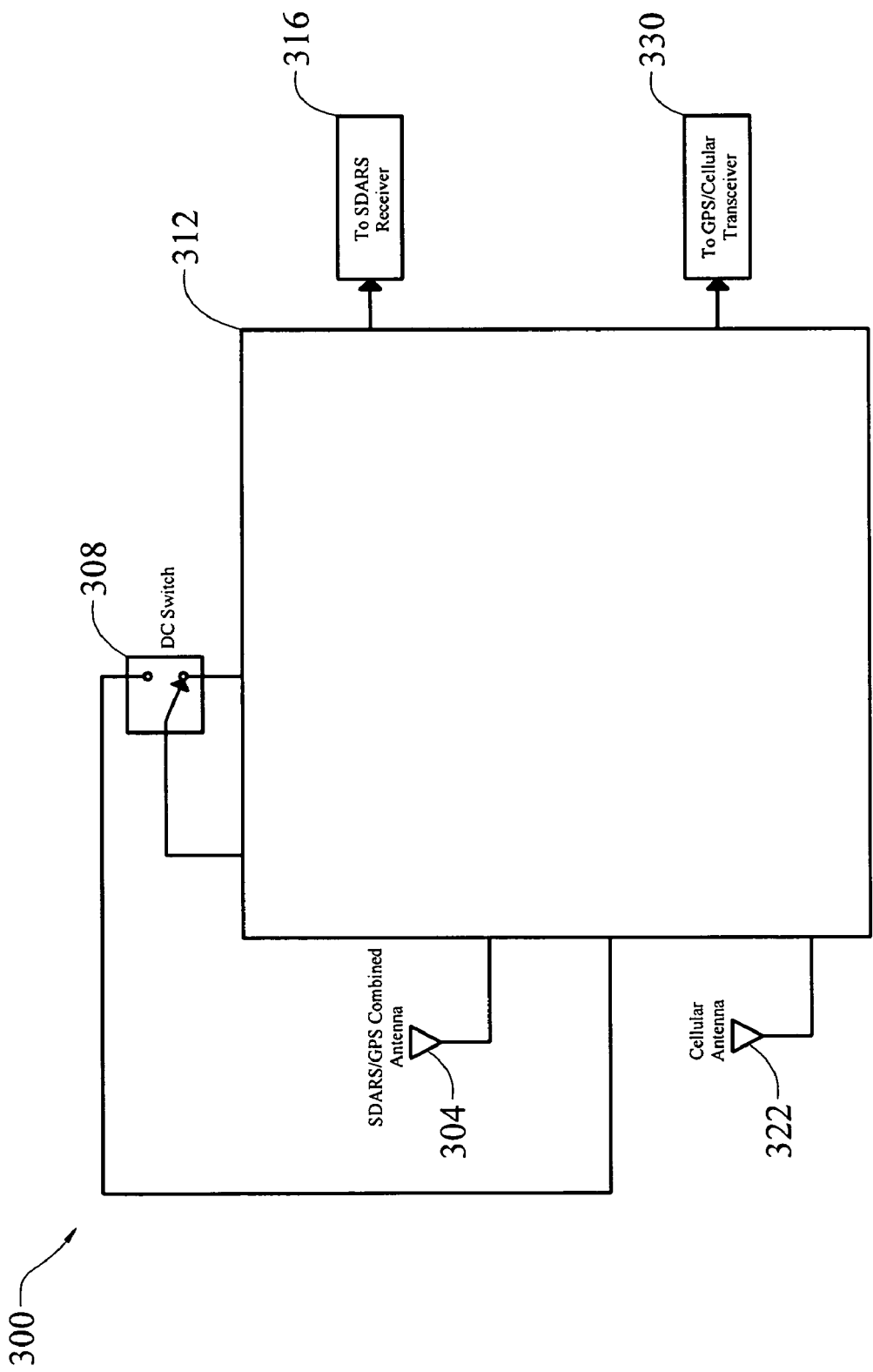
Figure 5:
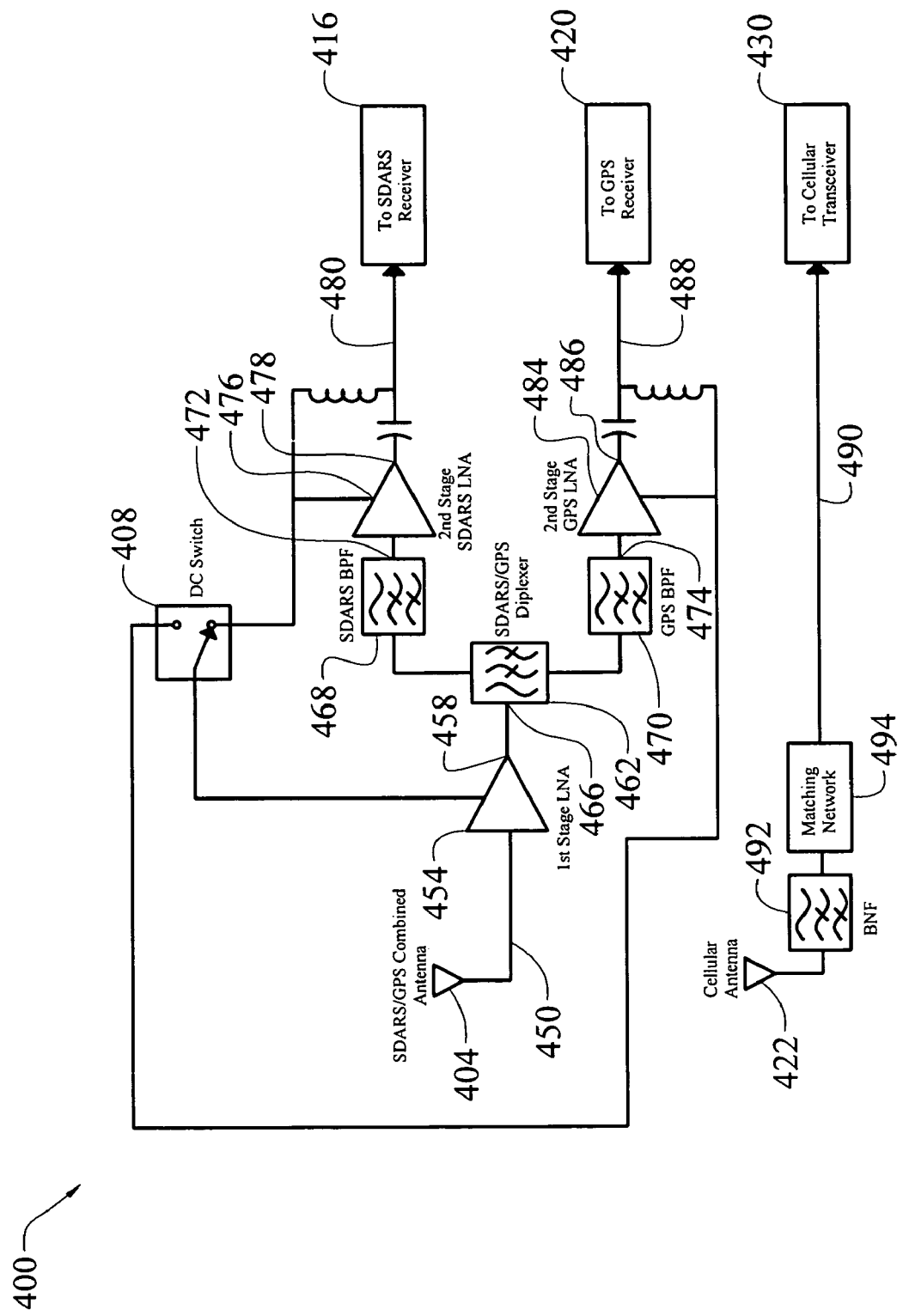
Figure 6:
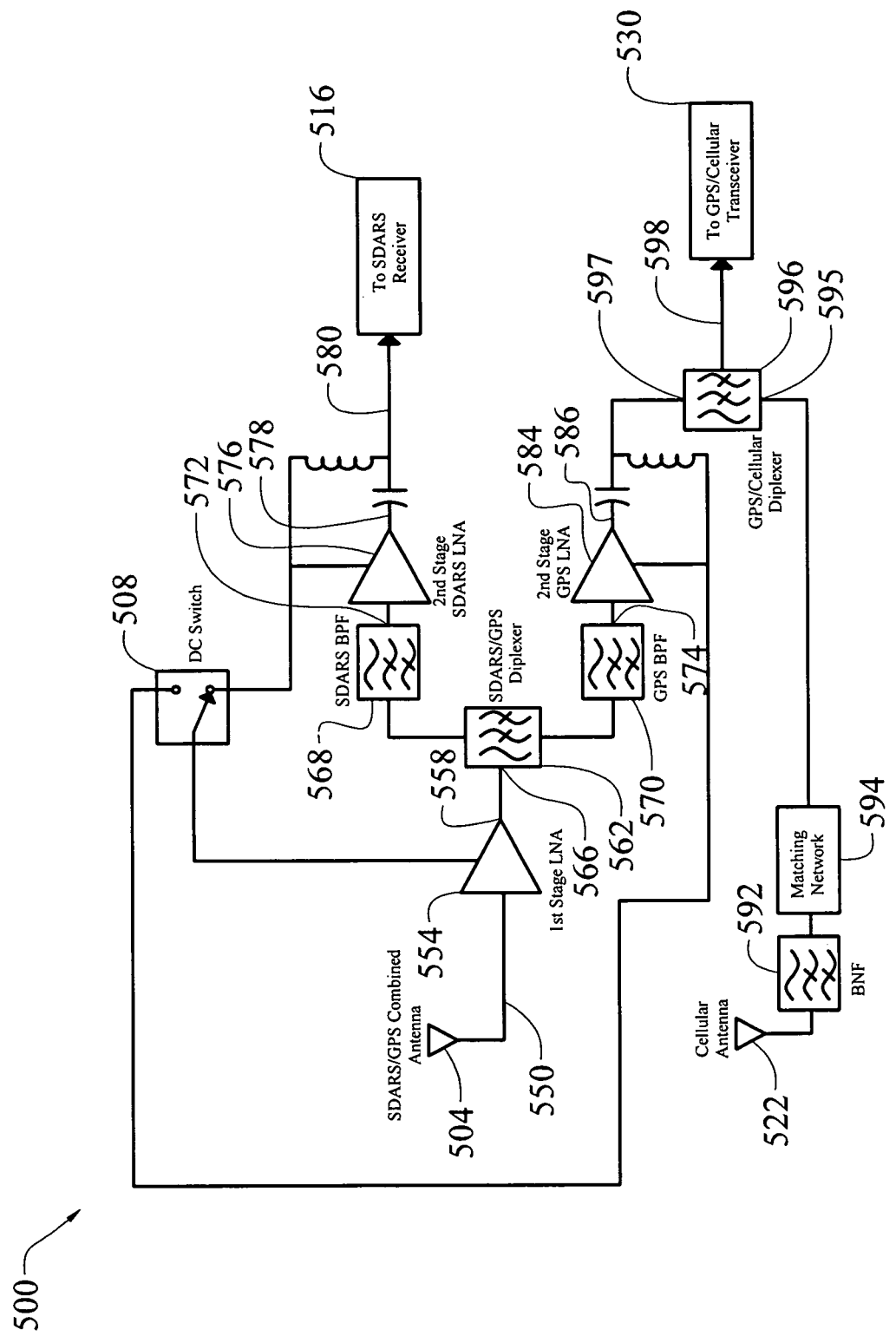

FIG. 4 is a functional block diagram of a system according to a further exemplary embodiment in which a DC switching mechanism is operable for selecting either a SDARS receiver or a combined GPS/cellular transceiver as the means through which a module receives electrical power, where that selection depends on whether the SDARS receiver, combined GPS/cellular transceiver, or both are present and activated;

FIG. 5 is a functional block diagram of a system according to an exemplary embodiment in which a DC switching mechanism is operable for selecting either a SDARS or GPS receiver as the means through which a first stage amplifier receives electrical power, where that selection depends on whether the SDARS receiver, GPS receiver, or both are present and activated; and FIG. 6 is a functional block diagram of a system according to a further exemplary embodiment in which a DC switching mechanism is operable for selecting either a SDARS receiver or a combined GPS/cellular transceiver as the means through which a first stage amplifier receives electrical power, where that selection depends on whether the SDARS receiver, combined GPS/cellular transceiver, or both are present and activated.

DETAILED DESCRIPTION

The following description is merely exemplary in nature and is not intended to limit the present disclosure, application, or uses.

Automobile OEMs (original equipment manufacturers) typically build to order based on designs of the value added reseller, which, in turn, are based on customer demands. To this end, it is not uncommon for OEMs to make available different options to choose from in regard to what onboard communications equipment (e.g., receivers, transceivers, etc.) will be included in a purchased automobile. For example, OEMS may provide any one or more of the following options: a SDARS receiver (e.g., SIRIUS or XM satellite radio receiver, etc.); a GPS navigation receiver; a cellular transceiver; and/or a combined GPS/cellular transceiver. With the combined GPS/cellular transceiver, the antenna for receiving the cellular signal is usually collocated with the antenna for receiving GPS signals, and the GPS and cellular devices typically have their own requirements and specifications for their corresponding antenna. Accordingly, automobile OEMs may provide vehicles with either or both a SDARS receiver and/or a combined GPS/cellular transceiver. Therefore, it would be desirable for automobile OEMs to be able to use the same feed lines to accommodate these various situations to standardize installation, alleviate part proliferation, and improve cost-effectiveness.

For example, antenna packages have been developed in which multiple antennas receive and output multiple signals on multiple feeds. These packages, however, often are undesirably complex and expensive, and the multiple feeds are undesirable. In addition, each package is often particularly tailored to feed the particular component(s) present. While these antenna packages have proven effective and popular, there is an ever increasing need for more standardized antenna packages of increasingly simple, compact, uniform, and low-cost design capable of being used regardless of what components are present.

As disclosed herein, exemplary circuit embodiments are provided for use a combined SDARS/GPS antenna utilizing a single feed (e.g., coaxial cable, other suitable communication link, etc.) from the antenna to, for example, an input of a low noise amplifier (LNA), etc. By using a common or shared feed (e.g., coaxial cable, other suitable communication link, etc.) for communicating both the SDARS and GPS signals to the input of the LNA, these embodiments may also allow for cost reductions as compared to the costs associated with those systems having separate feeds for the SDARS and GPS signals.

Such embodiments may also include controllers (e.g., DC switching schemes, etc.) that allow for operation regardless of whether only one of the SDARS radio receiver or GPS navigation receiver is present and activated (i.e., activated, turned on, and drawing power, etc.), or both receivers are present and activated. That is, the controller automatically switches to a first setting or a second setting. When the presence of an activated first receiver is detected (regardless of whether there is also an activated second receiver), the controller is in the first setting (e.g., a default setting, etc.) such that the antenna assembly (e.g., LNA, etc.) receives electrical power for operation via the activated first receiver. But when no activated first receiver is present and there is an activated second receiver, the controller will be in the second setting such that the antenna assembly (e.g., LNA, etc.) receives electrical power for operation via the activated second receiver.

In other embodiments, exemplary circuit embodiments are provided for use with both a combined SDARS/GPS antenna and a cellular antenna. Such embodiments include a single feed from the antenna SDARS/GPS antenna to, for example, an input of a low noise amplifier, etc. for the SDARS and GPS signals. There is also a single feed from, for example, a diplexer, etc. to a GPS/cellular transceiver, etc. for the GPS signals and cellular signals. By combining both the GPS and cellular signals on one feed (e.g., coaxial cable, other suitable communication link, etc.), these embodiments may allow for reduced overall system cost for such combined GPS/cellular transceivers by reducing the number of cable harnesses needed. Plus, some embodiments include a DC switching scheme that also allows for selective operation with a standalone SDARS receiver, a standalone cellular/GPS transceiver, or both.

Figure 1:
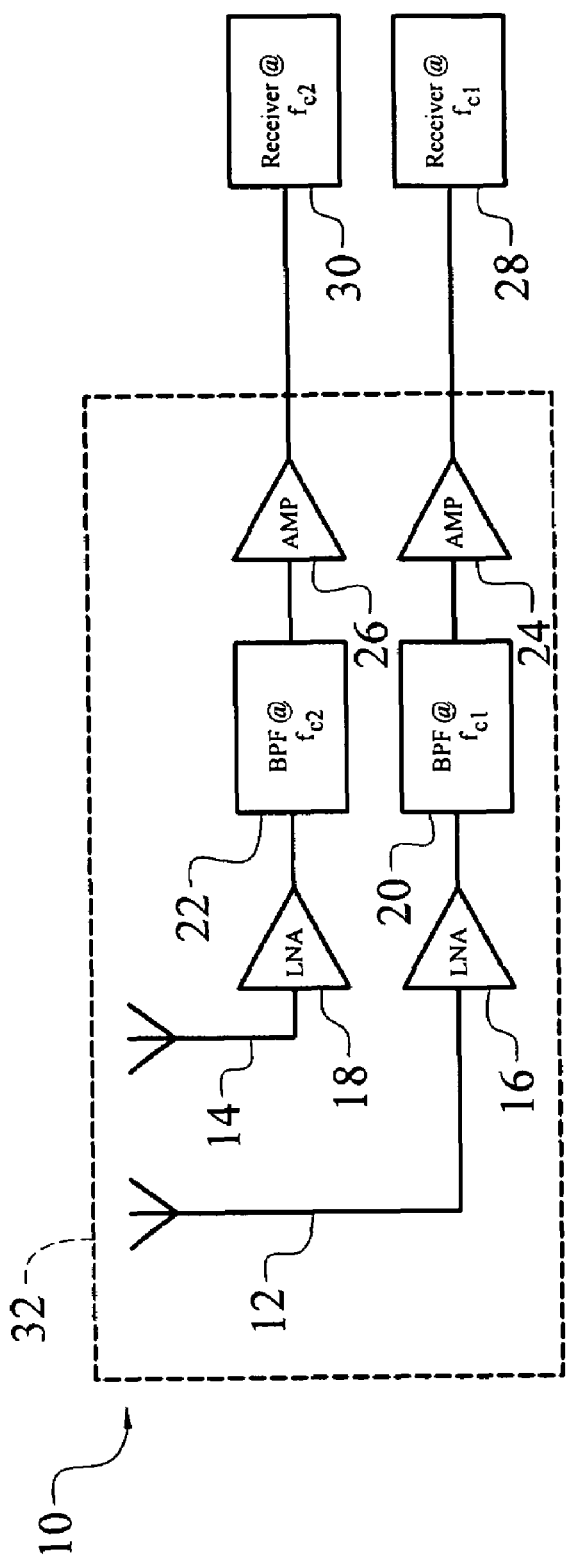
FIG. 1 is a functional block diagram of a dual-frequency antenna system in accordance with the prior art.
Figure 2:
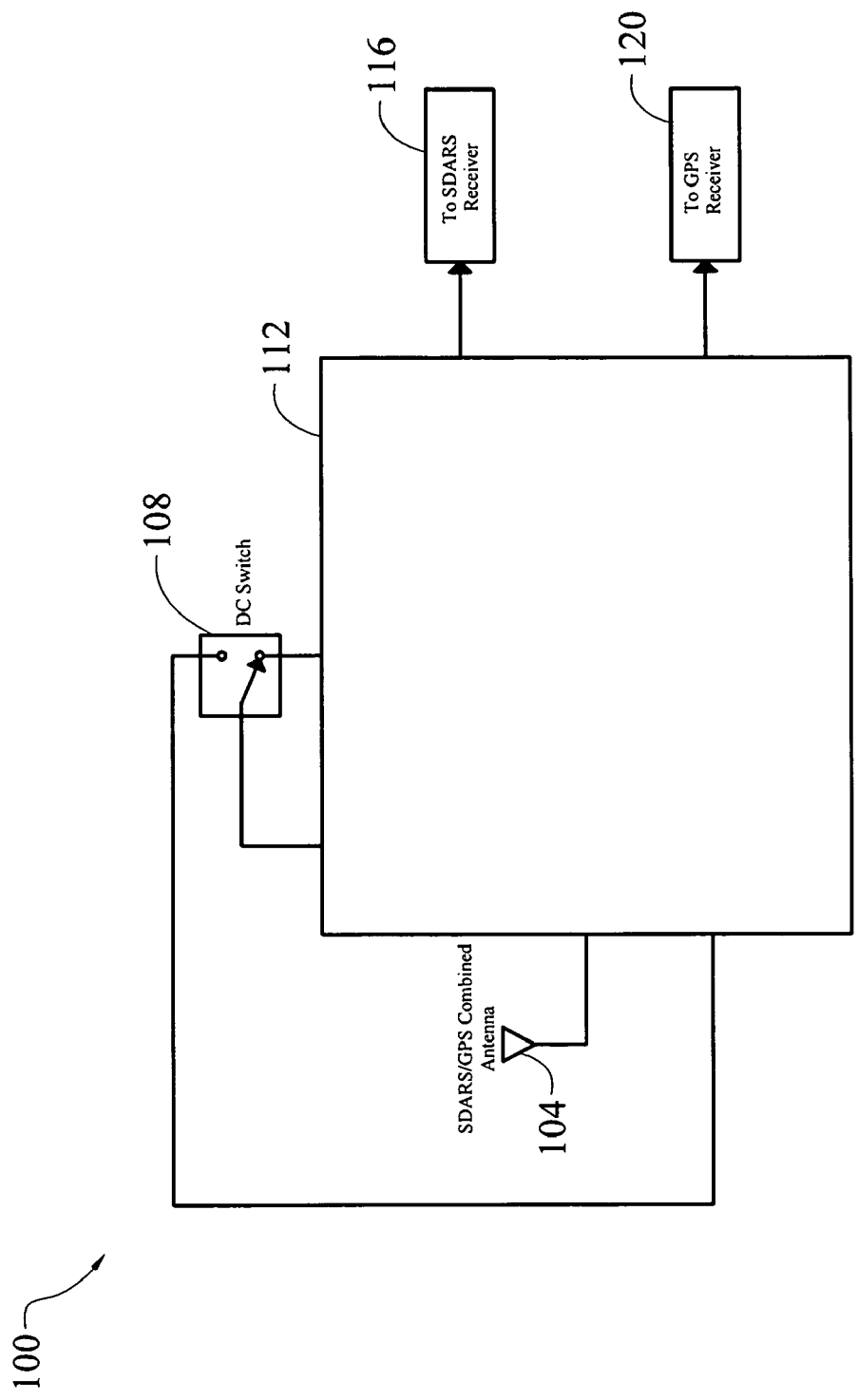
FIG. 2 is a functional block diagram of a system according to an exemplary embodiment in which a DC switching mechanism is operable for selecting either a SDARS receiver or a GPS receiver as the means through which a module receives electrical power, where that selection depends on whether the SDARS receiver, GPS receiver, or both are present and activated.

FIG. 2 is a functional block diagram of an exemplary antenna system 100 embodying one or more aspects of the present disclosure. As shown, the system 100 generally includes a multi-frequency antenna 104, a DC switching mechanism 108 (more broadly, a "controller"), and a module 112 in communication with the multi-frequency antenna 104 and DC switching mechanism 108. The module 112 is also shown in communication with a SDARS receiver 116 and a GPS receiver 120.

In the illustrated embodiment of FIG. 2, the DC switching mechanism 108 is operable for selecting either the SDARS receiver 116 or GPS receiver 120 as the control means through which the module 112 receives electrical power for operation. The selection or setting for the DC switching mechanism 108 will depend on whether there is current flow between the DC switching mechanism 108 and either the SDARS receiver 116, the GPS receiver, or both. In other words, the setting for the DC switching mechanism 108 will depend on whether there is present in the vehicle the SDARS receiver 116, GPS receiver 120, or both and which receiver(s) has been activated or turned on by the end user.

In some embodiments, the DC switching mechanism 108 includes first and second settings. When the DC switching mechanism 108 is in a first setting (as shown in FIG. 2), the module 112 receives electrical power via the SDARS receiver 116. But the module 112 will receive electrical power via the GPS receiver 120 when the DC switching mechanism 108 is in the second setting (not shown, but the setting in which the switch is moved upward, for example, in FIG. 2).

In some embodiments, the DC switching mechanism 108 will automatically be in the first setting (e.g., remain status quo or automatically change to the first setting) if the SDARS receiver 116 is present and turned on, regardless of whether there is a GPS receiver 120 present and turned on. But if the GPS receiver 120 is on and the SDARS receiver 116 is off or not present in the vehicle, the DC switching mechanism 108 will automatically change to the second setting. Alternatively, other embodiments may include the DC switching mechanism 108 that is automatically in the second setting so long as there is a GPS receiver 120 present and on, regardless of whether there is a SDARS receiver 116 present and/or turned on.

In some embodiments, the first setting may be a default setting. In alternative embodiments, the default setting for the DC switching mechanism 108 may be reversed (e.g., the second setting) such that the default is for the module 112 to receive electrical power via the GPS receiver 120.

In FIG. 2, the control means has been described as a DC switching mechanism 108. In some preferred embodiments, the DC switching mechanism 108 is based on discrete transistors. Alternative embodiments may include a digital control circuit for achieving the same DC switching function. Accordingly, the DC switching function may be achieved by analog circuitry in some embodiments or by digital circuitry in other embodiments. Other suitable means may also be used for accomplishing the switching or the functionality of the DC switching mechanism.

The module 112 may comprise a wide range of configurations (e.g., components, circuitry, hardware, software, firmware, low noise amplifiers, amplifiers, band pass filters, diplexers, resistors, capacitors, inductors, various forms of passive RF circuitry, etc.) depending, for example, at least in part on the particular system requirements and specifications in which the module 112 will be used. As described hereinafter, FIGS. 5 and 6 illustrate exemplary configurations for a module or circuit assembly. While the module 112 may include the same configuration as shown in either FIG. 5 or FIG. 6, other configurations are also possible for the module 112.

In addition, FIG. 2 illustrates the system 100 operating with GPS and SDARS signals. Other embodiments, however, may include a system configured for use with other signals and with other devices besides GPS and SDARS receivers. For example, FIGS. 4 and 6 respectively illustrate exemplary systems 300 and 500 that are configured for operating with combination devices 330 and 530, respectively, that include a GPS receiver and cellular transceiver (also generally referred to herein as a GPS/cellular transceiver). By way of further example, other embodiments may include systems having an AM/FM antenna and/or a Wi-Fi/Wi-Max antenna. For example, one such system may include a satellite radio antenna, a GPS antenna, and an AM/FM antenna. As yet another example, a system may include a satellite radio antenna, a GPS antenna, a cellular phone antenna, an AM/FM antenna, and a Wi-Fi/Wi-Max antenna.

FIG. 2 also shows the system 100 as including both the SDARS receiver 116 and the GPS receiver 120. As a result of the functionality enabled by the DC switching mechanism 108, either device 116 or 120 may be removed from the system 100 without rendering the other device inoperable. In other words, the DC switching mechanism 108 still allows the system 100 to be used even when only one or the other of the SDARS receiver 116 or GPS receiver 120 is physical present.

With continued reference to FIG. 2, the system 100 includes a single multi-frequency antenna 104 configured for receiving both SDARS and GPS signals. By way of example, the antenna 104 may comprise a microstrip patch antenna. The antenna 104 may have a stacked patch design or a coplanar patch design. Other embodiments may include an antenna configured for receiving signals besides GPS and SDARS signals, such as AM/FM signals and/or Wi-FI/Wi-Max signals. In addition, other embodiments might also include two separate antennas for receiving signals at different frequencies.

By way of example only, the antenna 104 may comprise one or more of the antennas disclosed in one or more of co-pending U.S. Patent Application No. U.S. application Ser. No. 11/145,878 filed Jun. 6, 2005, U.S. patent application Ser. No. 11/606,333 filed Nov. 29, 2006, the disclosures of which are incorporated herein by reference.

Figure 3:
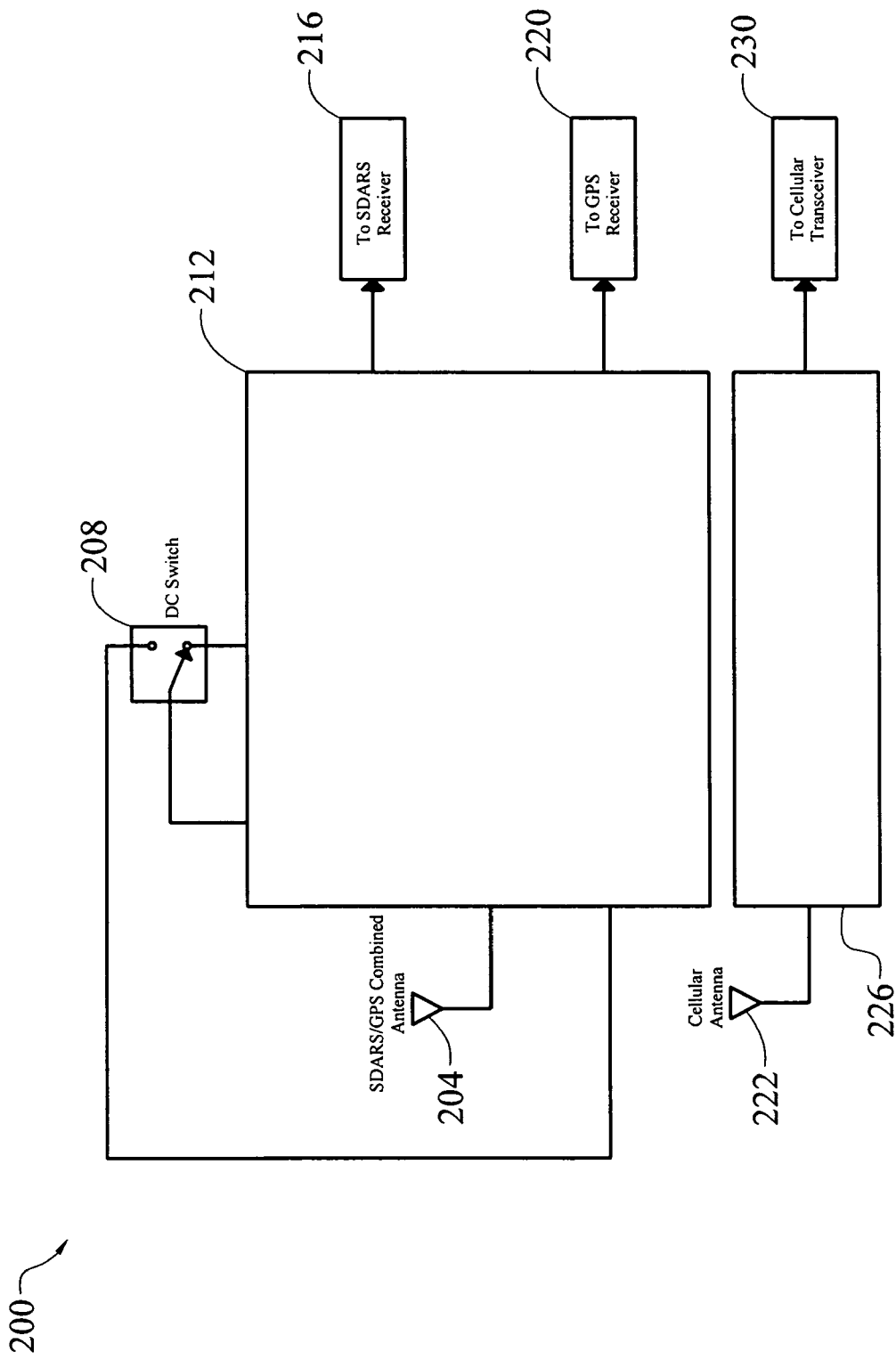
FIG. 3 is a functional block diagram of another exemplary embodiment of the system shown in FIG. 2 but also including an independent cellular communication system.

FIG. 3 is a functional block diagram of an exemplary system 200 embodying one or more aspects of the present disclosure. As shown, the system 200 generally includes a multi-frequency antenna 204 (e.g., microstrip (patch antenna, etc.), a DC switching mechanism 208, and a module 212 in communication with the multi-frequency antenna 204 and DC switching mechanism 208. The module 212 is also shown in communication with a SDARS receiver 216 and a GPS receiver 220. The functionality of these various portions of the system 200 may be substantially identical to that disclosed for system 100, and accordingly, will not be described again.

In addition, the system 200 also includes a cellular antenna 222 and a module 226 in communication with the antenna 222. The module 226 may receive cellular signals received by the antenna 222, and then communicate signals to an external cellular communication device, such as cellular transceiver 230 (e.g., cellular phone, etc.).

The module 226 may comprise a wide range of configurations (e.g., components, circuitry, hardware, software, firmware, low noise amplifiers, amplifiers, band pass filters, diplexers, resistors, capacitors, inductors, various forms of passive RF circuitry, etc.) depending, for example, at least in part on the particular system requirements and specifications in which the module 226 will be used. As described hereinafter, FIG. 5 illustrates an exemplary configuration for a module or circuit assembly. While the module 226 may include the same configuration as shown in FIG. 5, other configurations are also possible for the module 226.

FIG. 4 illustrates an exemplary system 300 embodying one or more aspects of the present disclosure. As shown, the system 300 generally includes a multi-frequency antenna 304 (e.g., microstrip patch antenna, etc.), a DC switching mechanism 308, an antenna 322 for receiving cellular signals, and a module 312. The module 312 is in communication with the multi-frequency antenna 304, cellular antenna 322, and DC switching mechanism 308. The module 312 is also shown in communication with a SDARS receiver 316 and a combined GPS/cellular transceiver 330.

The module 312 may comprise a wide range of configurations (e.g., components, circuitry, hardware, software, firmware, matching networks, low noise amplifiers, amplifiers, band pass filters, diplexers, resistors, band notch filters, matching networks, capacitors, inductors, various forms of passive RF circuitry, etc.) depending, for example, at least in part on the particular system requirements and specifications in which the module 312 will be used. As described hereinafter, FIG. 6 illustrates an exemplary configuration for a module or circuit assembly. While the module 312 may include the same configuration as shown in FIG. 6, other configurations are also possible for the module 312.

In this particular embodiment, the DC switching mechanism 308 may be configured such that the module 312 receives power (e.g., DC power) from the SDARS receiver 316 if it is present in the vehicle and turned on. This is the particular setting shown in FIG. 4. But if the SDARS receiver 316 is off or not present in the vehicle, the DC switch mechanism 308 may switch the DC power that feeds to the module 312 from the SDARS receiver 316 to the GPS/cellular transceiver 330. When the SDARS receiver 316 is turned back on, the DC switching circuit 308 switches the DC power feeding the module 312 back to the SDARS receiver 316.

FIG. 5 is a functional block diagram of an exemplary system 400 embodying one or more aspects of the present disclosure. As shown, the system 400 employs an architecture that allows a single coaxial cable 450 (or other suitable communication line) to communicate GPS and SDARS signals from a SDARS/combined antenna 404 to an input of a first stage amplification circuit 454. By using a common or shared feed (e.g., coaxial cable, other suitable communication link, etc.) for communicating both the SDARS and GPS signals to the input to the first stage amplification circuit 454, this embodiment may also allow for cost reductions as compared to the costs associated with those systems having separate feeds for the SDARS and GPS signals. It should be noted that other embodiments may include additional circuitry, components, amplifiers, capacitors, etc. between the antenna 404 and first stage amplification circuit 454. In which case, the term "first stage amplification" may not necessarily mean an "initial stage amplification".

With continued reference to FIG. 5, the first stage amplification circuit 454 may be a low noise amplifier (LNA). The input to the first stage amplification circuit 454 may be received from a GPS/SDARS microstrip (patch) antenna 404. The antenna 404 may be a stacked patch design or a coplanar patch design.

The GPS/SDARS antenna 404 may include a single feed probe such that the GPS and SDARS signals are present on the single feed probe pin. The combined GPS and SDARS signals are fed into the first stage low noise amplifier circuit 454, which may be a discrete amplifier design based on a low noise transistor. For example, the low noise transistor may be matched at its input and output to both GPS and SDARS signals at their two different frequencies, namely 1574 to 1576 MHz for GPS and 2.320 to 2.345 GHz for SDARS. During operation, the low noise amplifier 454 may amplify the signals with noise figure (NF) less than 1.5 decibels at GPS frequencies and the signals with noise figure (NF) less than 1.0 decibels at SDARS frequencies. The gain of the first stage amplification 454 may be about 15 decibels for both signals. At output 458, both signals are amplified and present. The numerical values set forth herein (e.g., 1.0 decibels, 15 decibels, etc.) are provided herein for purposes of illustration only, as the operational performance parameters may be changed depending on the particular system specifications and requirements. Accordingly, other configurations are possible for the amplification circuit 454, including other discrete transistor configurations and amplification accomplished inside or within an integrated circuit configuration (e.g., RF Integrated Circuit (RFIC), a Monolithic Microwave Integrated Circuit (MMIC), etc.

The output 458 of the first low noise amplifier 454 (combined GPS and SDARS signals) is split into two paths using a diplexing circuit 462. The diplexing circuit 462 may be designed such that at its input port 466, the SDARS band pass filter (BPF) path presents an open circuit or relatively high impedance to the GPS signal, while the GPS band pass filter path presents an open circuit or relative high impedance at the SDARS frequencies. After the signal split is achieved, each signal is fed into a corresponding SDARS or GPS band pass filter 468 or 470 for the respective bands, thereby filtering out any signals outside that particular band of operation. Accordingly, the filtered SDARS signal will be present at output 472, and the filtered GPS signal will be present at output 474.

The filtered SDARS signal present at output 472 is then amplified further by a second discrete amplification circuit 476, for example, by a second stage low noise amplifier with a gain of about 15 decibels. The output 478 of this amplification circuit 476 may be sent to the SDARS receiver 416 via a coaxial cable 480 (or other suitable communication link). In some embodiments, it may be desirable to have a third stage amplification circuit (not shown) for the SDARS signals to accommodate a longer cable and the higher losses associated therewith.

The SDARS receiver 416 provides the power (e.g., DC power) to operate this second low noise amplifier 476 via the same coaxial cable that provides the signal to the SDARS receiver 416. This may be referred to as "phantom power". The SDARS receiver 416 knows that the antenna 404 is in communication with the SDARS receiver 416 by sensing the current drawn by the antenna amplifier.

The filtered GPS signal present at output 474 may also be amplified by a second discrete amplification circuit 484, for example, by a second stage low noise amplifier with a gain of about 15 decibels. Output 486 of this amplification stage 484 may be sent to the GPS receiver 420 via a coaxial cable 488 (or other suitable communication link). In some embodiments, it may be desirable to have a third stage amplification circuit (not shown) for the GPS signals to accommodate a longer cable and the higher losses associated therewith.

The GPS receiver 420 provides the power (e.g., DC power) to operate this second amplification circuit 484 via the same coaxial cable 488 that provides the signal to the GPS receiver 420. This may be referred to as "phantom power". The GPS receiver 420 knows that the antenna 404 is in communication with the GPS receiver 420 by sensing the current drawn by the antenna amplifier.

Regarding the functionality of the DC switching mechanism 408, the first stage amplifier 454 DC power will normally be coming from the GPS receiver 420 if the SDARS receiver 416 is off or not present in the vehicle. If the SDARS receiver 416 is present in the vehicle and also turned on, the switching circuit 408 will switch the DC power that feeds the first stage amplifier 454 from the GPS receiver 420 to the SDARS receiver 416. This configuration is illustrated in FIG. 5. If the SDARS receiver 416 is turned off, the switching circuit 408 switches the DC power feeding the first stage amplifier 454 back to the GPS receiver 420.

It should also be noted that other embodiments may be configured with a controller (e.g., DC switch, analog circuitry, digital circuitry, other control circuitry, etc.) for selectively controlling how electrical power (e.g., DC power) is provided to both first and second stages of amplification (e.g., first and second low noise amplifiers, etc.). Still other embodiments may include an RF Integrated Circuit (RFIC) and/or a Monolithic Microwave Integrated Circuit (MMIC) that include amplification stage(s) within or inside the integrated circuit assemblies (instead of discrete amplification circuits). In such embodiments, amplification (e.g., first and/or second amplification stages, etc.) may occur within or inside the RFIC or MMIC, and a controller (e.g., DC switch, analog circuitry, digital circuitry, other control circuitry, etc.) may selectively control how electrical power is provided to the RFIC or MMIC.

FIG. 5 also illustrates an antenna 422 for receiving cellular signals. In some embodiments, the cellular antenna 422 may be co-located within the same package as the GPS/SDARS antenna 404. But cellular signals received by the antenna 422 are fed by a separate coaxial cable 490 to the cellular transceiver 430 in the vehicle. Notably, the circuit shown in FIG. 5 for the GPS/SDARS will work without a cellular antenna present 422, such as when the vehicle is only equipped with a GPS navigation system and a SDARS receiver.

The cellular signals may comprise AMPS signals having frequencies of 824 MHz to 894 MHz, PCS signals having frequencies of 1850 MHz to 1990 MHz, GSM frequencies for European markets, etc. As shown in FIG. 5, the cellular signals from the antenna 422 are fed into a Band Notch Filter (BNF) 492, which operates to help decouple the cellular antenna from either the GPS antenna, the SDARS antenna, or both. This BNF 492 may prove particularly helpful when the antennas 404 and 430 are co-located within the same package. The cellular signals may then be matched to fifty ohms by a matching network 494 and fed into the cellular transceiver 430.

FIG. 6 is a functional block diagram of an exemplary system 500 embodying one or more aspects of the present disclosure. As shown, the system 500 employs an architecture that allows both a single coaxial cable 550 (or other suitable communication link) to communicate GPS and SDARS signals from a SDARS/GPS antenna 504 to an input of a first stage amplification circuit 554, and a single coaxial cable 598 (or other suitable communication link) to communicate GPS and cellular signals to a GPS/cellular transceiver 530. Accordingly, this embodiment may allow for significant cost reductions as compared to the costs associated with those systems having separate feeds for the SDARS and GPS signals and separate feeds for the GPS and cellular signals. It should be noted that other embodiments may include additional circuitry, components, amplifiers, capacitors, etc. between the antenna 504 and first stage amplification circuit 554. In which case, the term "first stage amplification" may not necessarily mean an "initial stage amplification".

With continued reference to FIG. 6, the first stage amplification circuit 554 may be a low noise amplifier (LNA). The input to the first stage amplification circuit 554 may be received from a GPS/SDARS microstrip (patch) antenna 504. The antenna 504 may be a stacked patch design or a coplanar patch design.

The GPS/SDARS antenna 504 may include a single feed probe such that the GPS and SDARS signals are present on the single feed probe pin. The combined GPS and SDARS signals are fed from the GPS/SDARS antenna 504 into the first stage low noise amplifier circuit 554, which may be a discrete amplifier design based on a low noise transistor. For example, the low noise transistor may be matched at its input and output to both GPS and SDARS signals at their two different frequencies, namely 1574 to 1576 MHz for GPS and 2.320 to 2.345 GHz for SDARS. During operation, the low noise amplifier 554 amplifies the signals with noise figure (NF) less than 1.5 decibels at the GPS frequencies and the signal with noise figure (NF) less than 1.0 decibels at SDARS frequencies. The gain of the first stage amplification 554 may be about 15 decibels for both signals. At output 558, both signals are amplified and present. The numerical values set forth in herein (e.g., 1.0 decibels, 15 decibels, etc.) are provided herein for purposes of illustration only, as the operational performance parameters may be changed depending on the particular system specifications and requirements. Accordingly, other configurations are possible for the first stage amplifier 554, including other discrete transistor configurations and amplification accomplished inside or within an integrated circuit configuration (e.g., RF Integrated Circuit (RFIC), a Monolithic Microwave Integrated Circuit (MMIC), etc.

The output 558 of the first low noise amplifier 554 (combined GPS and SDARS signals) is split into two paths using a diplexing circuit 562. The diplexing circuit 562 may be designed such that at its input port 566, the SDARS band pass filter (BPF) path presents an open circuit or relatively high impedance to GPS signals, while the GPS BPF path presents an open circuit or relatively high impedance to the SDARS signals. After the signal split is achieved, each signal is fed into a corresponding SDARS or GPS band pass filter 568 or 570 for the respective bands, thereby filtering out any signals outside that particular band of operation. Accordingly, the filtered SDARS signal will be present at output 572, and the filtered GPS signal will be present at output 574.

The filtered SDARS signal present at output 572 is then amplified further by a second discrete amplification circuit 576, for example, by a second stage low noise amplifier with a gain of about 15 decibels. The output 578 of this amplification circuit 576 may be sent to the SDARS receiver 516 via a coaxial cable 580 (or other suitable communication link). In some embodiments, it may be desirable to have a third stage amplification circuit (not shown) for the SDARS signals to accommodate a longer cable and the higher losses associated therewith.

In this illustrated embodiment, the SDARS receiver 516 provides the power (e.g., DC power) to operate this second low noise amplifier 576 via the same coaxial cable that provides the signal to the SDARS receiver 516. This may be referred to as "phantom power". The SDARS receiver 516 knows that the antenna 504 is in communication with the SDARS receiver 516 by sensing the current drawn by the antenna amplifier.

The filtered GPS signal present at output 574 may be amplified by a second discrete amplifier stage 584, for example, by a second stage low noise amplifier with a gain of about 15 decibels. Output 586 of this amplification stage 584 may be sent to a diplexer 596. In some embodiments, it may be desirable to have a third stage amplification circuit (not shown) for the GPS signals to accommodate a longer cable and the higher losses associated therewith.

The GPS/cellular transceiver 530 provides the power (e.g., DC power) to operate this second amplification stage 584 via the same coaxial cable 598 that provides the signals to the GPS/cellular transceiver 530. This may be referred to as "phantom power". The GPS/cellular transceiver 530 knows that the antenna 504 is in communication with the GPS/cellular transceiver 530 by sensing the current drawn by the antenna amplifier.

Regarding the functionality of the DC switching mechanism 508, the first stage amplifier 554 DC power will normally be coming from the GPS/cellular transceiver 530 if the SDARS receiver 516 is off or not present in the vehicle. If the SDARS receiver 516 is present in the vehicle and also turned on, the switching circuit 508 will switch the DC power that feeds the first stage amplifier 554 from the GPS/cellular transceiver 530 to the SDARS receiver 516. This configuration is illustrated in FIG. 6. If the SDARS receiver 516 is turned off, the switching circuit 508 will switch the DC power feeding the first stage amplifier 554 back to the GPS/cellular transceiver 530.

It should also be noted that other embodiments may be configured with a controller (e.g., DC switch, analog circuitry, digital circuitry, other control circuitry, etc.) for selectively controlling how electrical power (e.g., DC power) is provided to both first and second stages of amplification (e.g., first and second low noise amplifiers, etc.). Still other embodiments may include an RF Integrated Circuit (RFIC) and/or a Monolithic Microwave Integrated Circuit (MMIC) that include amplification stage(s) within or inside the integrated circuit assemblies (instead of discrete amplification circuits). In such embodiments, amplification (e.g., first and/or second amplification stages, etc.) may occur within or inside the RFIC or MMIC, and a controller (e.g., DC switch, analog circuitry, digital circuitry, other control circuitry, etc.) may selectively control how electrical power is provided to the RFIC or MMIC.

FIG. 6 also illustrates an antenna 522 for receiving cellular signals. In some embodiments, the cellular antenna 522 may be co-located within the same package as the GPS/SDARS antenna 504.

The cellular signals may comprise AMPS signals having frequencies of 824 MHz to 894 MHz, PCS signals having frequencies of 1850 MHz to 1990 MHz, GSM frequencies for European markets, etc. As shown in FIG. 6, the cellular signals from the antenna 522 are input to a Band Notch Filter (BNF) 592, which operates to help decouple the cellular antenna from either the GPS antenna, the SDARS antenna, or both. This BNF 592 may prove particularly helpful when the antennas 504 and 530 are co-located within the same package.

The cellular signals may be matched to fifty ohms by a matching network 594 and fed into the GPS/cellular diplexer 596. The diplexer 596 operates to combine the cellular and GPS signals so that they can be carried to the combined GPS receiver/cellular transceiver 530 via a single coaxial cable 598. To combine the cellular and GPS signals, the diplexer 596 presents an open circuit at the GPS frequency band to the cellular antenna input 595, while presenting an open circuit or relatively high impedance at the cellular frequency bands to the GPS antenna input 597. In addition, the diplexer 596 also presents a minimal (or at least a relatively low) amount of insertion loss to the cellular signals path (e.g., one to two decibels maximum in some embodiments, etc.) so as not to degrade the performance of the cellular antenna 522. The diplexer 596 also operates to pass the DC power coming from the GPS/cellular transceiver 530 to the SDARS/GPS antenna 504, while also preventing (or at least inhibiting) that DC power from going into the cell antenna 522.

As used herein, the phrase "in communication with" generally refers to the ability of components, circuitry, devices, entities, etc. to communicate (whether bi-directional or uni-directional) with each other regardless of the presence of any intervening components, circuitry, devices, entities, etc. For example, a first device may still be considered "in communication with" a second device even if there is a third device therebetween, such that output generated by the first device is received (or a portion of that output) is ultimately received by the second device. As another example, a first device would also be considered "in communication with" a second device when there are no intervening devices, such that the first device is directly connected (e.g., by a single feed line, coaxial cable, other communication link, etc.) to the second device. In addition, direct connections (e.g., by a single feed or multiple feeds, coaxial cables, other communication links, etc.) are note required, for example, if the components are in wireless communication.

It should be noted that embodiments and aspects of the present disclosure may be used in a wide range of antenna applications, such as patch antennas, telematics antennas, antennas configured for receiving satellite signals (e.g., Satellite Digital Audio Radio Services (SDARS), Global Positioning System (GPS), cellular signals, etc.), terrestrial signals, antennas configured for receiving RF energy or radio transmissions (e.g., AM/FM radio signals, etc.), combinations thereof, among other applications in which wireless signals are communicated between antennas. Accordingly, the scope of the present disclosure should not be limited to only one specific form/type of antenna assembly.

Additionally, it should also be noted that embodiments and aspects of the present disclosure may be used in conjunction with any of a wide ranges of receivers, transceivers, communication devices, etc. Accordingly, the scope of the present disclosure should not be limited to only one specific form/type of receiver, transceiver, or other receiving and/or transmission device.

In addition, various antenna assemblies and components disclosed herein may be mounted to a wide range of supporting structures, including stationary platforms and mobile platforms. For example, an antenna assembly disclosed herein may be installed for use on an automobile, bus, train, aircraft, bicycle, motor cycle, helmet, among other mobile platforms. Accordingly, the specific references to vehicles herein should not be construed as limiting the scope of the present disclosure to any specific type of supporting structure or environment.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context. For example, the term "first stage" does not necessarily mean initial stage or beginning stage, unless clearly indicated by the context.

When introducing elements or features and the exemplary embodiments, the articles "a", "an", "the" and "the" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A method relating to electrically powering an amplifier of an antenna system operable for amplifying first and second signals having different frequencies, the method comprising:
   determining whether there is present and activated one or more of a first receiver associated with the first signal and a second receiver associated with the second receiver;
   electrical powering the amplifier via the first receiver when the first receiver is present and activated; and
   electrical powering the amplifier via the second receiver when the second receiver is present and activated and when the first receiver is not present and activated;
   wherein the method includes using a controller to automatically control whether the amplifier receives electrical rower from the first receiver or the second receiver;
   wherein the method includes using a DC switch to automatically control whether the amplifier receives electrical power from the first receiver or the second receiver;
   wherein the DC switch includes a first setting in which the amplifier receives electrical power via the first receiver, and a second setting in which the amplifier receives electrical power via the second receiver, and wherein the method includes automatically selecting the first setting for the DC switch when the first receiver is present and activated, and automatically selecting the second setting for the DC switch when the second receiver is present and activated and when the first receiver is not present and activated.

2. The method of claim 1, wherein the first signal has a frequency associated with a Satellite Digital Audio Radio Service (SDARS), wherein the first receiver comprises a SDARS receiver, wherein the second signal has a frequency associated with a Global Positioning System (GPS), and wherein the second receiver comprises a GPS navigation receiver.

3. The method of claim 1, further comprising inputting first and second signals received by a multi-frequency antenna to the amplifier with a single feed.

4. The method of claim 1, further comprising outputting a third signal received by a second antenna along with the second signal to the second receiver with a single feed.

5. The method of claim 4, wherein the first signal has a frequency associated with a Satellite Digital Audio Radio Service (SDARS), wherein the first receiver comprises a SDARS receiver, wherein the second signal has a frequency associated with a Global Positioning System (GPS), wherein the third signal has a frequency associated with cellular communications, and wherein the second receiver comprises a combined GPS navigation receiver and cellular transceiver.

6. The method of claim 1, wherein the steps of determining and electrically powering are performed automatically without user intervention except for the user activating or deactivating the first or second receiver.

7. An apparatus for use with an antenna system operable for receiving first and second signals having respective first and second frequencies, the apparatus comprising:
   a first stage amplifier for amplifying the first and second signals;
   a controller for selectively controlling whether the amplifier is electrically powered via a first receiver associated with the first frequency or a second receiver associated with the second frequency depending on whether the first receiver, second receiver, or both are present and activated;
   a diplexer in communication with the first stage amplifier for receiving and separating output of the first stage amplifier into first and second signals;
   a first band pass filter in communication with the diplexer for receiving the first signal;
   a second band pass filter in communication with the diplexer for receiving the second signal;
   a second stage amplifier in communication with the first band pass filter for receiving output of the first band pass filter; and
   a second stage amplifier in communication with the second band pass filter for receiving output of the second band pass filter.

8. The apparatus of claim 7, wherein the controller comprises a DC switch.

9. The apparatus of claim 8, wherein the DC switch includes a first setting in which the amplifier is electrically powered by the first receiver, and a second setting in which the amplifier is electrically powered by the second receiver.

10. The apparatus of claim 9, wherein the first setting is a default setting for the DC switch.

11. The apparatus of claim 7, wherein the amplifier comprises a low noise amplifier.

12. The apparatus of claim 7, further comprising a single feed for inputting the first and second signals to the amplifier.

13. The apparatus of claim 7, wherein the first signal has a frequency associated with a Satellite Digital Audio Radio Service (SDARS), wherein the first receiver comprises a SDARS receiver, wherein the second signal has a frequency associated with a Global Positioning System (GPS), and wherein the second receiver comprises a GPS navigation receiver.

14. An antenna system including the apparatus of claim 7 and a multi-frequency antenna for receiving the first and second signals.

15. The antenna system of claim 14, further comprising an antenna for receiving a third signal having a frequency different than the first and second frequencies.

16. The antenna system of claim 15, wherein the first signal has a frequency associated with a Satellite Digital Audio Radio Service (SDARS), wherein the first receiver comprises a SDARS receiver, wherein the second signal has a frequency associated with a Global Positioning System (GPS), wherein the third signal has a frequency associated with cellular communications, and wherein the second receiver comprises a combined GPS navigation receiver and cellular transceiver.

17. The apparatus of claim 7, further comprising:
   a diplexer in communication with the amplifier for receiving at least a portion of output of the amplifier and with an antenna for receiving a third signal having a third frequency different from the first and second frequencies; and a single feed for outputting signals of the diplexer to one of a receiver or a transceiver.

18. The apparatus of claim 7, further comprising feeds for outputting to respective first and second receivers output of the second stage amplifiers.

19. The apparatus of claim 7, wherein the controller comprises at least one or more of analog circuitry or digital circuitry.

20. The apparatus of claim 7, wherein the amplifier comprises at least one or more of a discrete amplification circuit or at least a portion of an integrated circuit assembly.

21. A method relating to electrically powering an amplifier of an antenna system operable for amplifying first and second Radio Frequency (RF) signals having different frequencies, the method comprising:
  determining whether there is present and activated one or more of a first receiver associated with the first RF signal and a second receiver associated with the second RF signal;
  electrical powering the amplifier via the first receiver when the first receiver is present and activated; and
  electrical powering the amplifier via the second receiver when the second receiver is present and activated and when the first receiver is not present and activated;
  wherein the method includes using a controller to automatically control whether the amplifier receives electrical power from the first receiver or the second receiver;
  wherein the method includes using a DC switch to automatically control whether the amplifier receives electrical power from the first receiver or the second receiver;
  wherein the DC switch includes a first setting in which the amplifier receives electrical power via the first receiver, and a second setting in which the amplifier receives electrical power via the second receiver, and wherein the method includes automatically selecting the first setting for the DC switch when the first receiver is present and activated, and automatically selecting the second setting for the DC switch when the second receiver is present and activated and when the first receiver is not present and activated.

22. The method of claim 21, wherein the first RF signal has a frequency associated with a Satellite Digital Audio Radio Service (SDARS), wherein the first receiver comprises a SDARS receiver, wherein the second RE signal has a frequency associated with a Global Positioning System (GPS), and wherein the second receiver comprises a GPS navigation receiver.

23. The method of claim 21, further comprising inputting first and second RF signals received by a multi-frequency antenna to the amplifier with a single feed.

24. The method of claim 21, further comprising outputting a third RF signal received by a second antenna along with the second RF signal to the second receiver with a single feed.

25. The method of claim 24, wherein the first RF signal has a frequency associated with a Satellite Digital Audio Radio Service (SDARS), wherein the first receiver comprises a SDARS receiver, wherein the second RF signal has a frequency associated with a Global Positioning System (GPS), wherein the third RF signal has a frequency associated with cellular communications, and wherein the second receiver comprises a combined GPS navigation receiver and cellular transceiver.

26. An apparatus for use with an antenna system operable for receiving first and second Radio Frequency (RF) signals having respective first and second frequencies, the apparatus comprising:
  a first stage amplifier for amplifying the first and second RF signals;
  a controller for selectively controlling whether the amplifier is electrically powered via a first receiver associated with the first frequency or a second receiver associated with the second frequency depending on whether the first receiver, second receiver, or both are present and activated;
  a diplexer in communication with the first stage amplifier for receiving and separating output of the first stage amplifier into first and second RF signals;
  a first RF band pass filter in communication with the diplexer for receiving the first RF signal;
  a second RF band pass filter in communication with the diplexer for receiving the second RF signal;
  a second stage amplifier in communication with the first RE band pass filter for receiving output of the first RF band pass filter; and
  a second stage amplifier in communication with the second RF band pass filter for receiving output of the second RF band pass filter.

27. The apparatus of claim 26, wherein the controller comprises a DC switch.

28. The apparatus of claim 27, wherein the DC switch includes a first setting in which the amplifier is electrically powered by the first receiver, and a second setting in which the amplifier is electrically powered by the second receiver.

29. The apparatus of claim 28, wherein the first setting is a default setting for the DC switch.

30. The apparatus of claim 26, further comprising a single feed for inputting the first and second RF signals to the amplifier.

31. The apparatus of claim 26, wherein the controller comprises at least one or more of analog circuitry or digital circuitry.

32. The apparatus of claim 26, wherein the amplifier comprises at least one or more of a discrete amplification circuit or at least a portion of an integrated circuit assembly.

33. An antenna system including the apparatus of claim 26 and a multi-frequency antenna for receiving the first and second RF signals.

34. The antenna system of claim 33, further comprising an antenna for receiving a third signal having a frequency different than the first and second frequencies.

* * * * *

UNITED STATES PATENT AND TRADEMARK OFFICE
CERTIFICATE OF CORRECTION

PATENT NO.       : 7,587,183 B2                                    Page 1 of 1
APPLICATION NO.  : 11/640507
DATED            : September 8, 2009
INVENTOR(S)      : Ayman Duzdar et al.

It is certified that error appears in the above-identified patent and that said Letters Patent is hereby corrected as shown below:

CLAIM 1, Column 13, Line 33: replace "rower" with "power"

CLAIM 22, Column 15, Line 44: replace "RE" with "RF"

CLAIM 26, Column 16, Line 27: replace "RE" with "RF"

Signed and Sealed this

Twenty-eighth Day of September, 2010

David J. Kappos
*Director of the United States Patent and Trademark Office*